(12) United States Patent
Chen

(10) Patent No.: US 8,478,121 B2
(45) Date of Patent: Jul. 2, 2013

(54) CAMERA WITH INFRARED SHUTTER MODULE

(75) Inventor: Yong-Jian Chen, Guangdong (CN)

(73) Assignees: Premier Image Technology (China) Ltd., Foshan (CN); Hon Hai Precision Industry Co., Ltd., New Taipei (TW)

(*) Notice: Subject to any disclaimer, the term of this patent is extended or adjusted under 35 U.S.C. 154(b) by 80 days.

(21) Appl. No.: 13/282,474

(22) Filed: Oct. 27, 2011

(65) Prior Publication Data

US 2013/0022346 A1    Jan. 24, 2013

(30) Foreign Application Priority Data

Jul. 21, 2011    (CN) .......................... 2011 1 0205119

(51) Int. Cl.
*G03B 17/00*    (2006.01)
(52) U.S. Cl.
USPC ......................................................... 396/263
(58) Field of Classification Search
USPC .................................................. 396/263, 502
See application file for complete search history.

(56) References Cited

U.S. PATENT DOCUMENTS

| 5,414,464 | A | * | 5/1995 | Sasaki | 348/222.1 |
| 5,528,337 | A | * | 6/1996 | Kawano | 396/502 |
| 5,570,151 | A | * | 10/1996 | Terunuma et al. | 396/52 |
| RE36,726 | E | * | 6/2000 | Kakiuchi | 396/263 |
| 6,148,154 | A | * | 11/2000 | Ishimaru et al. | 396/287 |
| 2002/0110373 | A1 | * | 8/2002 | Engle et al. | 396/263 |
| 2009/0052883 | A1 | * | 2/2009 | Lee et al. | 396/263 |
| 2013/0022346 | A1 | * | 1/2013 | Chen | 396/502 |

FOREIGN PATENT DOCUMENTS

CN    88200641 A    9/1988

* cited by examiner

*Primary Examiner* — W B Perkey
(74) *Attorney, Agent, or Firm* — Altis Law Group, Inc.

(57) ABSTRACT

A camera includes an image sensor, a storing module, an infrared shutter module, and a controlling module. The image sensor converts light rays projected thereon to digital image signals. The storing module is for storing the digital image signals. The infrared shutter module includes an infrared emitter and an infrared receiver adjacent to the infrared emitter, and when infrared rays emitted from the infrared emitter are transmitted into the infrared receiver, the infrared shutter module outputs a triggering signal. The controlling module electrically connects to the image sensor, the storing module, the infrared shutter module and stores the digital image signals in the storing module when receiving the triggering signal.

8 Claims, 3 Drawing Sheets

CAMERA WITH INFRARED SHUTTER MODULE

BACKGROUND

1. Technical Field

The present disclosure relates to cameras and, particularly, to a camera with an infrared shutter module.

2. Description of Related Art

Cameras may include a shutter button. When the shutter button is pressed, the cameras capture an image. However, inadvertent trembling or shaking may occur when the shutter button is pressed, resulting in a blurry image. Anti-shake mechanisms have been devised to overcome the problem. However, current anti-shake mechanisms are complicated and costly.

Therefore, it is desirable to provide a camera, which can overcome the limitations described.

DETAILED DESCRIPTION

Embodiments of the disclosure will now be described in detail, with reference to the accompanying drawings.

The word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash storing system, and hard disk drives.

Figure 1:
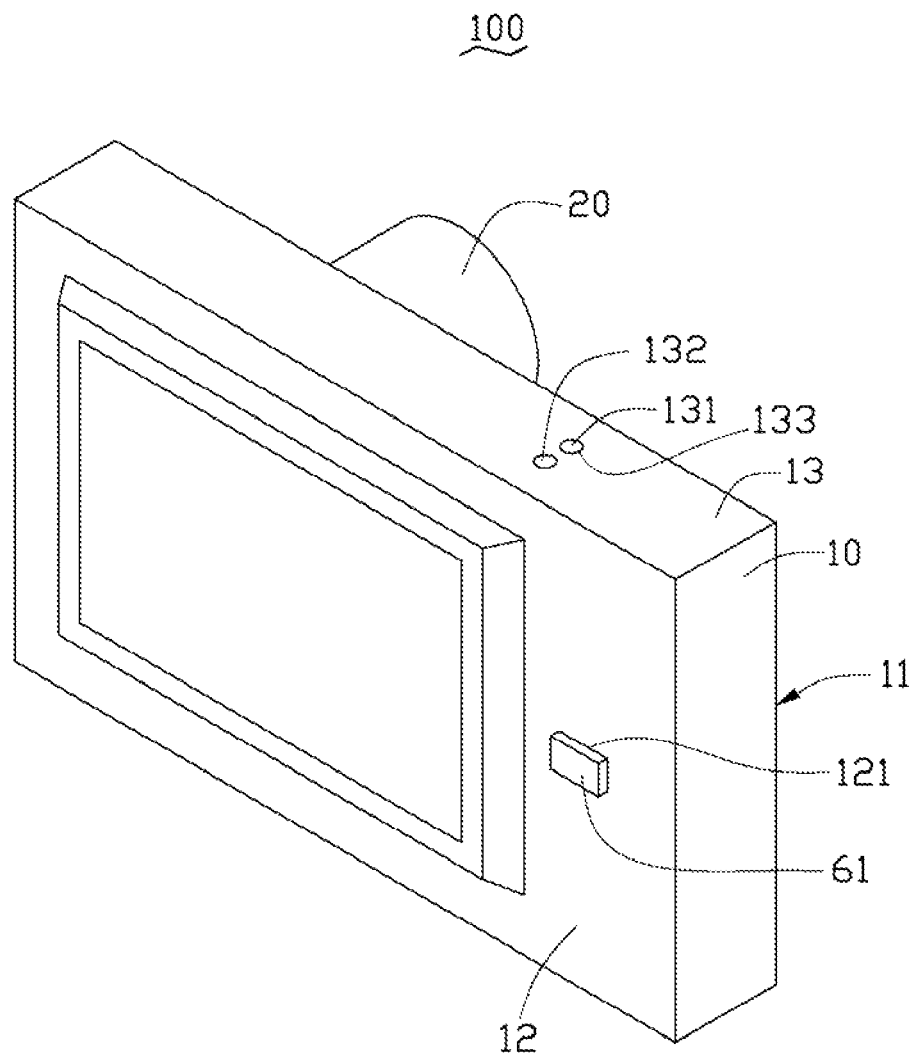
FIG. 1 is an isometric view of a camera in accordance with a first exemplary embodiment.
Figure 2:
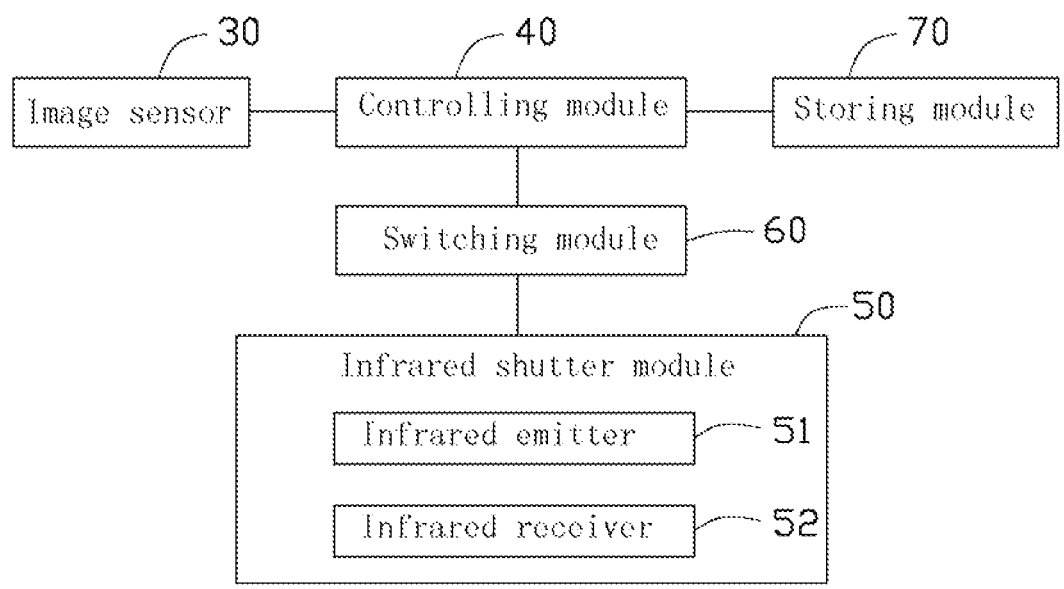
FIG. 2 shows the block functions of the camera of FIG. 1.

Referring to FIGS. 1-2, a camera 100, according to a first exemplary embodiment, includes a shell 10, a lens module 20, an image sensor 30, a controlling module 40, an infrared shutter module 50, a switching module 60, and a storing module 70.

The shell 10 is cuboid, and includes a front surface 11, a back surface 12, and an upper surface 13. The back surface 12 is opposite to the front surface 11. The upper surface 13 interconnects the front surface 11 and the back surface 12. A display screen (not labeled) is positioned on the back surface 12 and displays images. The shell 10 defines a through hole 121 in the back surface 12, generally adjacent to the display screen. The shell 10 defines a first hole 131 and a second hole 132 in the upper surface 13. The first hole 131 is adjacent to the second hole 132. The first hole 131 and the second hole 132 are covered by two transparent elements 133 made of glass or plastic for example.

The lens module 20 is detachably positioned on the front surface 11 of the shell 10, and captures light rays reflected from an object. The lens module 20 may be imbedded in the shell 10.

The image sensor 30 is received in the shell 10, and faces the lens module 20. The light rays passing through the lens module 20 are received on the image sensor 30. The image sensor 30 converts the light rays to digital image signals. In this embodiment, the image sensor 30 is Charge Coupled Device (CCD) or Complementary Metal-Oxide-Semiconductor Transistor (CMOS).

The controlling module 40 is a Micro programmed control unit (MCU), and is electrically connected to the image sensor 30, the infrared shutter module 50, and the storing module 70. When the controlling module 40 receives a triggering signal from the infrared shutter module 50, the controlling module 40 stores the digital image signals generated by the image sensor 30 in the storing module 70.

The infrared shutter module 50 includes an infrared emitter 51 and an infrared receiver 52 adjacent to the infrared emitter 51. The infrared emitter 51 and the infrared receiver 52 are received in the shell 10, and face the upper surface 13. The infrared receiver 52 can be activated only by rays emitted from the infrared emitter 51. When the infrared receiver 52 receives rays emitted from the infrared emitter 51, the infrared shutter module 50 outputs the triggering signal.

To ensure that the infrared rays emitted from the infrared emitter 51 can be received by the infrared receiver 52, the axial line of the infrared emitter 51 extended above the camera 100 will intersect with the extended axial line of the infrared receiver 52 at a predetermined distance above the upper surface 13, and a vertical line down from the point of intersection to the horizontal upper surface 13 will meet the upper surface 13 between the two transparent elements 133. In this embodiment, the infrared rays emitted from the infrared emitter 51 and the infrared rays received by the infrared receiver 52 form two equal angles with the upper surface 13. The values of the two angles equal to each other, and are greater than 0° and lower than 60°.

The switching module 60 is received in the shell 10, and includes a pressing portion 61 protruding from the through hole 121. The switching module 60 is electrically connected between the controlling module 40 and the infrared shutter module 50. When the pressing portion 61 is pressed, the switching module 60 is switched on, and the controlling module 40 connects to the infrared shutter module 50. When the pressing portion 61 is pressed again, the switching module 60 is switched off, and the controlling module 40 disconnects from the infrared shutter module 50.

One or more software codes of the modules are stored in the storing module 70 and executed by the controlling module 40.

When the camera 100 is first powered on, the switching module 60 is switched off and thus the infrared shutter module 50 is inactive. The infrared shutter module 50 will not output the triggering signal, therefore the camera 100 can not capture an image.

When the user wants to capture an image, the user presses the pressing portion 61 of the switching module 60. The switching module 60 is switched on, and the controlling module 40 connects to the infrared shutter module 50. The user puts an IR-reflective surface (such as a human finger) above the transparent elements 133, generally in vicinity of the intersection. The infrared rays being emitted from the infrared emitter 51 transmit through the first hole 131 and are reflected by the finger(s) of the user. The reflected infrared rays transmit through the second hole 132 and are received by the infrared receiver 52. When the infrared receiver 52 receives the rays reflected from the finger(s), the infrared shutter module 50 outputs the triggering signal to the controlling module 40. The controlling module 40 stores the digital image signals generated by the image sensor 30 in the storing module 70 and in this way the camera 100 may capture an image.

Figure 3:
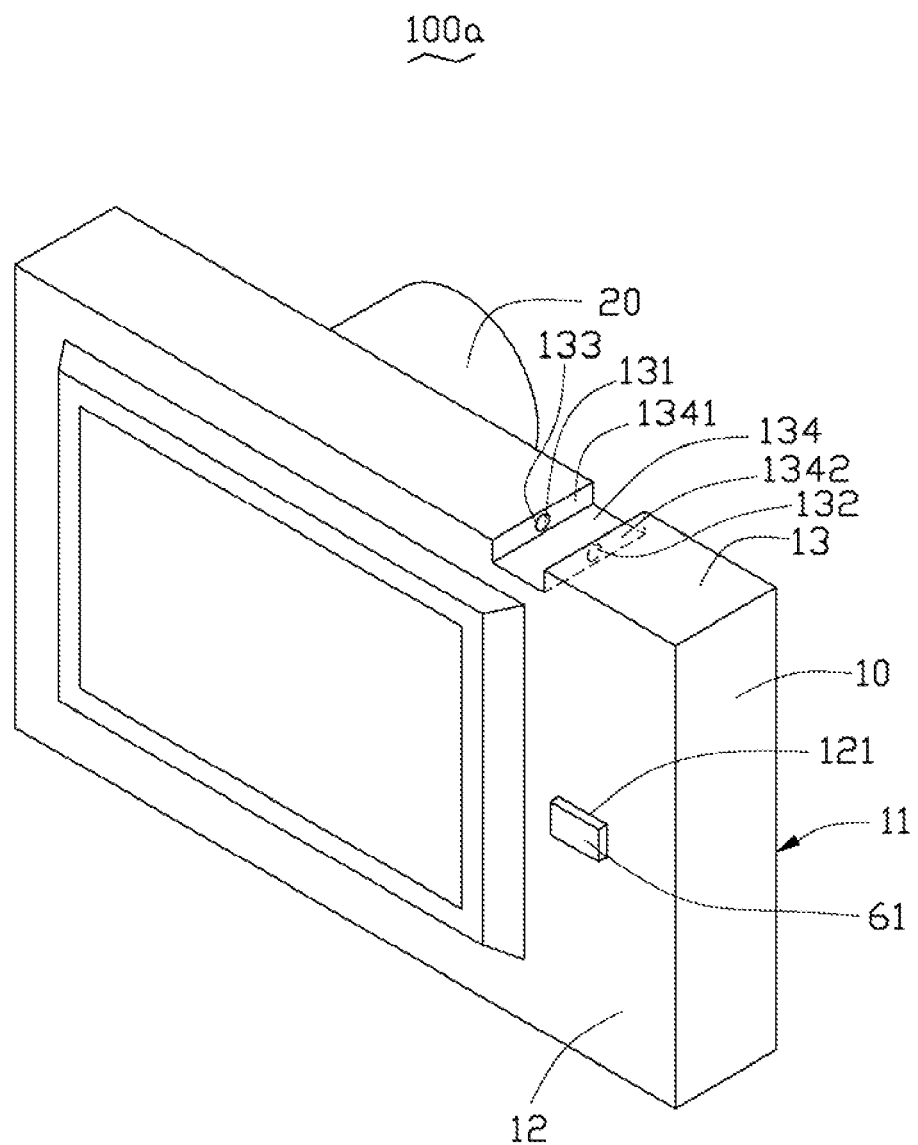
FIG. 3 is an isometric view of a camera in accordance with a second exemplary embodiment.

Referring to FIG. 3, a camera 100a is shown, according to a second exemplary embodiment. The difference between the camera 100a of the second exemplary embodiment and the camera 100 of the first exemplary embodiment is that the shell 10 defines a notch 134 on the upper surface 13. The notch 134 extend through the front surface 11 and the back surface 12, and includes a first side surface 1341 and a second side surface 1342. facing the first side surface 1341. The first hole 131 and the second hole 132 are defined on the first side surface 1341 and the second side surface 1342 respectively and aligned with each other. The transparent elements 133 cover the first hole 131 and the second hole 132. The infrared emitter 51 and the infrared receiver 52 are received in the shell 10, and face each other. In the second exemplary embodiment, the infrared shutter module 50 outputs the triggering signal when the constant supply of infrared rays into the infrared receiver 52 is interrupted.

In the second embodiment, when the camera 100a is first powered on, the switching module 60 is switched off, but infrared rays emitted from the infrared emitter 51 transmit through the first hole 131 and the second hole 132 and are received by the infrared received 52 from the beginning When the infrared rays emitted from the infrared emitter 51 are not received by the infrared received 52 because the path of the rays is blocked by a human finger or other object putting in the notch 134, the infrared shutter module 50 outputs the triggering signal. As the triggering signal can not be transmitted to the controlling module 40, the digital image signals generated by the image sensor 30 will not be stored in the storing module 70. Therefore, the camera 100 can not capture an image.

When the user does want to capture an image, the user presses the pressing portion 61 of the switching module 60. The switching module 60 is switched on, and the controlling module 40 connects to the infrared shutter module 50. The user puts his finger(s) in the notch 134 to block the infrared rays emitted from the infrared emitter 51 from being received by the infrared receiver 52. The infrared shutter module 50 outputs the triggering signal to the controlling module 40 and the controlling module 40 stores the digital image signals generated by the image sensor 30 in the storing module 70. Therefore, the camera 100a captures an image.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A camera, comprising:
an image sensor converting light rays projected thereon to digital image signals;
a storing module storing the digital image signals;
an infrared shutter module comprising an infrared emitter and an infrared receiver adjacent to the infrared emitter, the infrared shutter module being configured to output a triggering signal upon a condition that infrared rays emitted from the infrared emitter are received by the infrared received;
a controlling module electrically connected with the image sensor, the storing module and the infrared shutter module, the controlling module storing the digital image signals in the storing module when receiving the triggering signal;
a switching module electrically connected between the infrared shutter module and the controlling module, when the switching module is switched on, and the controlling module connects to the infrared shutter module; when the switching module is switched off, and the controlling module disconnects to the infrared shutter module.

2. The camera of claim 1, further comprising a shell, the shell comprising a front surface, a back surface opposite to the front surface, and an upper surface connected between the front surface and the back surface; the image sensor, the storing module, the infrared emitter, the infrared receiver and the controlling module received in the shell.

3. The camera of claim 2, wherein the shell defines a first hole and a second hole on the upper surface, the infrared emitter faces the first hole and the infrared emitter faces the second hole, an axial line of the infrared emitter extending above the upper surface intersects with an axial line of the infrared receiver at a predetermined distance above the upper surface, and a vertical line down from the point of intersection to the upper surface meets the upper surface between the first and second holes.

4. The camera of claim 2, wherein the switching module comprises a pressing portion protruding out of the back surface.

5. A camera, comprising:
an image sensor converting light rays projected thereon to digital image signals;
a storing module storing the digital image signals;
an infrared shutter module comprising an infrared emitter and an infrared receiver adjacent to the infrared emitter, the infrared shutter module being configured to output a triggering signal upon a condition that infrared rays emitted from the infrared emitter is not received by the infrared received;
a controlling module electrically in communication with the image sensor, the storing module and the infrared shutter module, the controlling module storing the digital image signals in the storing module when receiving the triggering signal;
a switching module electrically connected between the infrared shutter module and the controlling module, when the switching module is switched on, and the controlling module connects to the infrared shutter module; when the switching module is switched off, and the controlling module disconnects to the infrared shutter module.

6. The camera of claim 5, further comprising a shell, the shell comprising a front surface, a back surface opposite to the front surface, and an upper surface connected between the front surface and the back surface; the image sensor, the storing module, the infrared emitter, the infrared receiver and the controlling module received in the shell.

7. The camera of claim 6, wherein the shell defines a notch in the upper surface, the notch comprises a first side surface and a second side surface facing the first side surface, the first side surface defines a first hole, the second side surface defines a second hole, the first and second holes are aligned with each other, the infrared emitter faces the first hole, and the infrared emitter faces the second hole.

8. The camera of claim 6, wherein the switching module comprises a pressing portion protruding out of the back surface.

* * * * *